United States Patent [19]

Bartholomew

[11] Patent Number: 5,171,028
[45] Date of Patent: Dec. 15, 1992

[54] SNAP AND LOCK QUICK CONNECTOR

[75] Inventor: Donald D. Bartholomew, Mt. Clemens, Mich.

[73] Assignee: Proprietary Technology, Inc., Southfield, Mich.

[21] Appl. No.: 818,395

[22] Filed: Jan. 2, 1992

Related U.S. Application Data

[63] Continuation of Ser. No. 465,773, Jan. 16, 1990, abandoned.

[51] Int. Cl.⁵ .................. F16J 15/00; F16L 37/12
[52] U.S. Cl. ................................. 277/189; 277/187; 277/188 R; 285/319; 285/921
[58] Field of Search ............. 285/319, 921; 277/189, 277/178, 186, 102, 188 R, 187

[56] References Cited

U.S. PATENT DOCUMENTS

| | | |
|---|---|---|
| 730,378 | 6/1903 | Lambert . |
| 921,691 | 5/1909 | Friday . |
| 922,132 | 5/1909 | Gold .................... 277/186 X |
| 938,731 | 11/1909 | Ward .................... 277/186 |
| 1,251,767 | 1/1918 | Gold .................... 277/186 |
| 1,542,421 | 6/1925 | Strongson . |
| 1,837,345 | 12/1931 | Thomas . |
| 1,976,589 | 10/1934 | Trickey . |
| 2,123,889 | 7/1938 | Gleason . |
| 2,441,344 | 5/1948 | Bosworth . |
| 2,585,887 | 2/1952 | Woodward . |
| 3,182,119 | 5/1965 | Millard .................... 277/186 |
| 3,314,696 | 4/1967 | Ferguson et al. . |
| 3,450,424 | 6/1969 | Calisher . |
| 3,453,005 | 7/1969 | Foults . |
| 3,527,485 | 9/1970 | Goward et al. . |
| 3,534,988 | 10/1970 | Lindsey . |
| 3,538,940 | 11/1970 | Graham . |
| 3,569,903 | 3/1971 | Brishka .................... 285/319 X |
| 3,574,359 | 4/1971 | Klein . |
| 3,584,902 | 6/1971 | Vyse . |
| 3,628,768 | 12/1971 | Hutt . |
| 3,711,125 | 1/1973 | Dehar .................... 285/319 X |
| 3,718,350 | 2/1973 | Klein . |
| 3,724,882 | 4/1973 | Dehar . |
| 3,780,773 | 12/1973 | Haugen . |
| 3,826,523 | 7/1974 | Eschbaugh .................... 285/319 X |
| 3,929,356 | 12/1975 | DeVincent et al. . |
| 3,929,357 | 12/1975 | DeVincent et al. .................... 285/319 |

(List continued on next page.)

FOREIGN PATENT DOCUMENTS

| | | |
|---|---|---|
| 163947 | 9/1949 | Austria . |
| 2360921 | 6/1974 | Fed. Rep. of Germany . |
| 2307154 | 8/1974 | Fed. Rep. of Germany . |
| 2611233 | 9/1977 | Fed. Rep. of Germany . |
| 2622269 | 11/1977 | Fed. Rep. of Germany . |
| 881439 | 7/1980 | U.S.S.R. . |
| 634848 | 3/1950 | United Kingdom . |
| 693094 | 6/1953 | United Kingdom . |
| 718350 | 11/1954 | United Kingdom . |
| 781554 | 8/1957 | United Kingdom . |
| 791247 | 2/1958 | United Kingdom . |
| 1030535 | 5/1966 | United Kingdom . |
| 1145667 | 3/1969 | United Kingdom . |
| 1172348 | 11/1969 | United Kingdom . |
| 1343665 | 1/1974 | United Kingdom . |
| 1350546 | 4/1974 | United Kingdom . |
| 2011002 | 7/1979 | United Kingdom . |
| 2014115 | 8/1979 | United Kingdom . |

Primary Examiner—Allan N. Shoap
Attorney, Agent, or Firm—Harness, Dickey & Pierce

[57] ABSTRACT

A quick connect assembly for use with tubular conduits is disclosed as comprising a housing with flange portions which prevent separation of the conduits by abutting with the retaining insert of a retainer element. When desired, the conduits can be separated by depressing surface areas attached to flexion configuration arms thereby providing clearance between the flange portions and the retaining inserts so the retaining element can be pulled away from the housing.

3 Claims, 2 Drawing Sheets

U.S. PATENT DOCUMENTS

| | | | |
|---|---|---|---|
| 3,933,378 | 1/1976 | Sandford et al. | 285/319 |
| 3,980,324 | 9/1976 | Bouteille et al. | |
| 4,005,883 | 2/1977 | Guest . | |
| 4,009,896 | 3/1977 | Brewer . | |
| 4,080,752 | 3/1978 | Burge . | |
| 4,111,464 | 9/1978 | Asano et al. . | |
| 4,123,089 | 10/1978 | Viero et al. . | |
| 4,123,091 | 10/1978 | Cosentino et al. . | |
| 4,128,264 | 12/1978 | Oldford | 285/319 X |
| 4,135,745 | 1/1979 | Dehar | 285/319 |
| 4,136,885 | 1/1979 | Uhrner . | |
| 4,158,407 | 6/1979 | Rest . | |
| 4,214,586 | 7/1980 | Mericle . | |
| 4,219,222 | 8/1980 | Brusadin . | |
| 4,220,361 | 9/1980 | Brandenberg | 285/921 X |
| 4,244,608 | 1/1981 | Stuemky . | |
| 4,266,814 | 5/1981 | Gallagher | 285/319 |
| 4,423,892 | 1/1984 | Bartholomew | 285/319 |
| 4,483,371 | 11/1984 | Susin . | |
| 4,483,543 | 11/1984 | Fisher Jr. et al. . | |
| 4,524,995 | 6/1985 | Bartholomew . | |
| 4,601,497 | 7/1986 | Bartholomew | 285/319 |
| 4,679,832 | 7/1987 | Meinig | 285/921 X |
| 4,681,350 | 7/1987 | Gaita | 285/319 X |
| 4,681,351 | 7/1987 | Bartholomew | 285/319 |

SNAP AND LOCK QUICK CONNECTOR

This is a continuation of U.S. Pat. application Ser. NO. 465,773, filed Jan. 16, 1990, now abandoned.

BACKGROUND AND SUMMARY OF THE INVENTION

The present invention relates to a connector assembly for providing a snap and lock quick connection.

In the automotive industry, as well as for many other industries, the need always exists for low cost, reliable, and easy to assemble components. This need is especially apparent with respect to providing a connection between fluid carrying conduits, such as fuel or refrigerant lines. In older threaded connectors, substantial assembly time could be accumulated in screwing on a cap to a fitting and tightening the cap down to the proper torque needed to provide for a fluid tight seal. Further, an inventory would have to be maintained to keep track of the number of caps and fittings, and any liners or other components that may be necessary. Also, retightening of the caps may be required to maintain the seal after the automobile or other system has been put in use.

Accordingly, it is the primary object of the present invention to provide an improved connector assembly for providing a snap and lock quick connection between fluid conveying conduits.

In addition, it is an object of the present invention to provide a pre-assembled connector housing and retainer assembly so that a connection to a tubular fluid conveying conduit may be made in one step without resorting to any tools.

Another object of the present invention is provide a pre-assembled connector housing and retainer assembly so that a snapping connection may be made to a tubular fluid conveying conduit.

It is another object of the present invention to provide a pre-assembled connector conduit unit which requires only a one-step snapping connection to be joined to a connector housing.

It is also an object of the present invention to provide an improved retainer assembly which operates to both secure the conduit in the axial bore of the housing and position the sealing element within the axial bore of the housing.

It is also a more specific object of the present invention to provide a connector assembly which uses a retaining insert to secure the retaining element inside the housing.

It is a more specific object of the present invention to provide a seal retainer which prevents the high pressure blowout of the O-rings and bushings used to form the fluid tight seal.

To achieve the foregoing objects, the present invention provides a snap and lock connector assembly which generally comprises tubular conduits, a housing, a primary retaining member, a retaining insert and a seal retainer. The tubular conduit is adapted to convey fluid. The housing is formed with an axial bore for receiving the conduit at a first end and for providing a fluid path at a second end, and includes incurved flange portions to abut a retaining insert. The seal retainer is disposed within the axial bore of the housing for providing a fluid tight seal between the confronting tubular conduit portions. The retainer assembly is adapted to be in contact with the housing to provide the locking mechanism. The retainer assembly, which includes a retaining insert secured by a primary retaining member is snapped into the housing. The retaining insert abuts a flange portion of the housing to lock in the retainer assembly until it is released by depressing a surface area which causes flexion of configuration arms at the collar joint which allows clearance between the flange portion of the housing and the retaining insert.

Additional objects and advantages of the present invention will become apparent from a reading of the detailed description of the preferred embodiment which makes reference to the following set of drawings.

DETAILED DESCRIPTION OF THE PREFERRED EMBODIMENT

Figure 1:
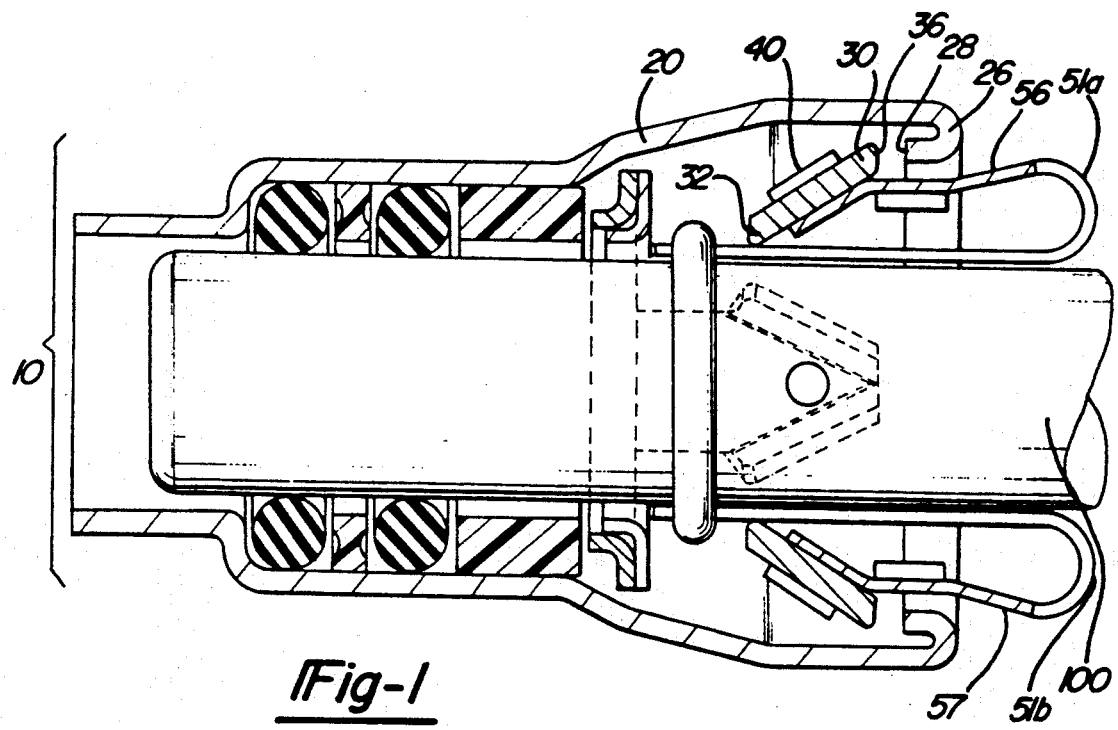
FIG. 1 is a side elevation view, partially in cross-section of the primary retaining member and seal retainer inserted into the housing structure.

Referring to FIG. 1, a side elevation view, partially in cross-section of connector assembly 10, according to the present invention, is shown. The connector assembly 10 is generally comprised of a housing 20, a retaining insert 30, a primary retaining member 50, and a seal retainer 80. The retaining insert is adapted to provide a rounded edge 32 for pivoting on configuration arms 54(a-d) when depressible surface areas 56 and 57 are sufficiently pinched together. Housing 20 is shown to be formed with an axial bore 22 through which conduit 100 passes through. Housing 20 also includes a radially disposed surface 26, which is incurved so as to provide a surface 28 which prevents removal of the primary retaining member 50 by contacting with the abutting retaining insert surface 36 when the connector assembly 10 is forced away from the housing structure 20. The housings radially disposed surface 26 also serves to provide an abutting surface to prevent the undesired removal of the seal retainer 80.

In the preferred embodiment, the snap and lock connection of connector assembly 10 is accomplished when primary retaining member 50 is inserted into the housing structure 20, as shown. As the insertion of the primary retaining member occurs, once the abutting retaining surface 36 clears, the most distal part of the radially disposed surface 26 pivoting occurs at rounded edge 32 of retaining insert 30 and the abutting surface 36 moves into a position of abutment and can no longer clear the radially disposed surface 26 as the primary retaining member 50 is pulled away from the housing 20. This occurs because the configuration arms 54(a-d) are made of a resilient material such as metal or plastic which causes the configuration arms to return to their unflexed position. The only way to disconnect the primary retaining member 50 from the housing 20 is to apply pressure to surface areas 56 and 57 by pinching them together. As surface areas 56 and 57 are pinched together, flexion occurs at joints 62(a-d) and pivoting by the retaining insert 30, occurs on configuration arms 54 at rounded edge 32 of retaining insert 30 effectuating adequate clearance between the retaining insert 30 and the radially disposed surface 26 so that by simultaneously depressing surface areas 56 and 57 and pulling retainer element 50 away from housing 20, disconnection will result.

Figure 2:
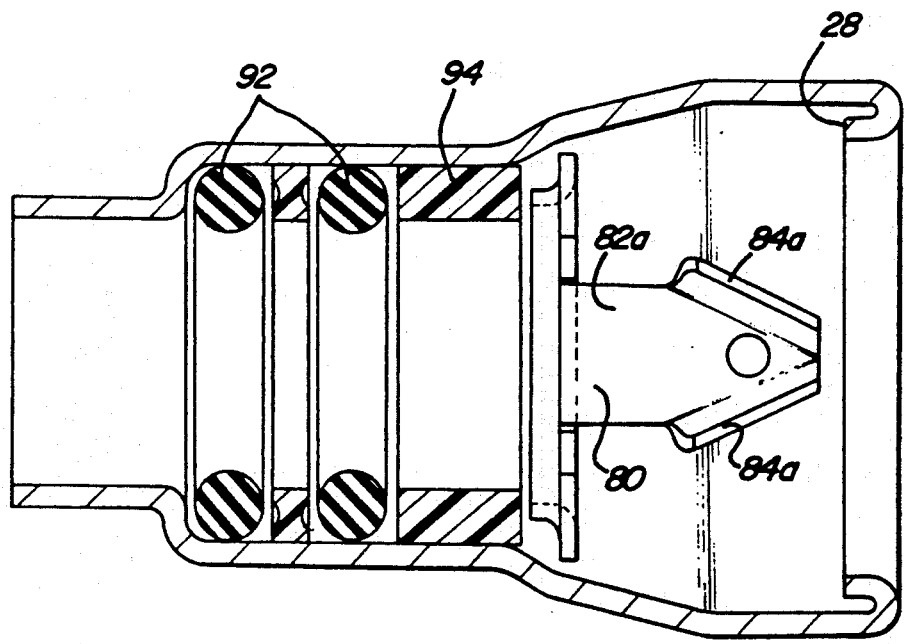
FIG. 2 is a side elevation view, partially in cross-section of the seal retainer inserted into the housing.

Referring to FIG. 2, a side elevation view, partially in cross-section of the seal retainer 80 inserted into the housing 20, according to the present invention, is shown. As the insertion of the seal retainer 80 occurs, once the arm portions 82 clear the housings radially disposed surface 26, the seal retainer 80 is locked in and prevents the high pressure blowout of the O-rings 92 and bushings 94.

Figure 3:
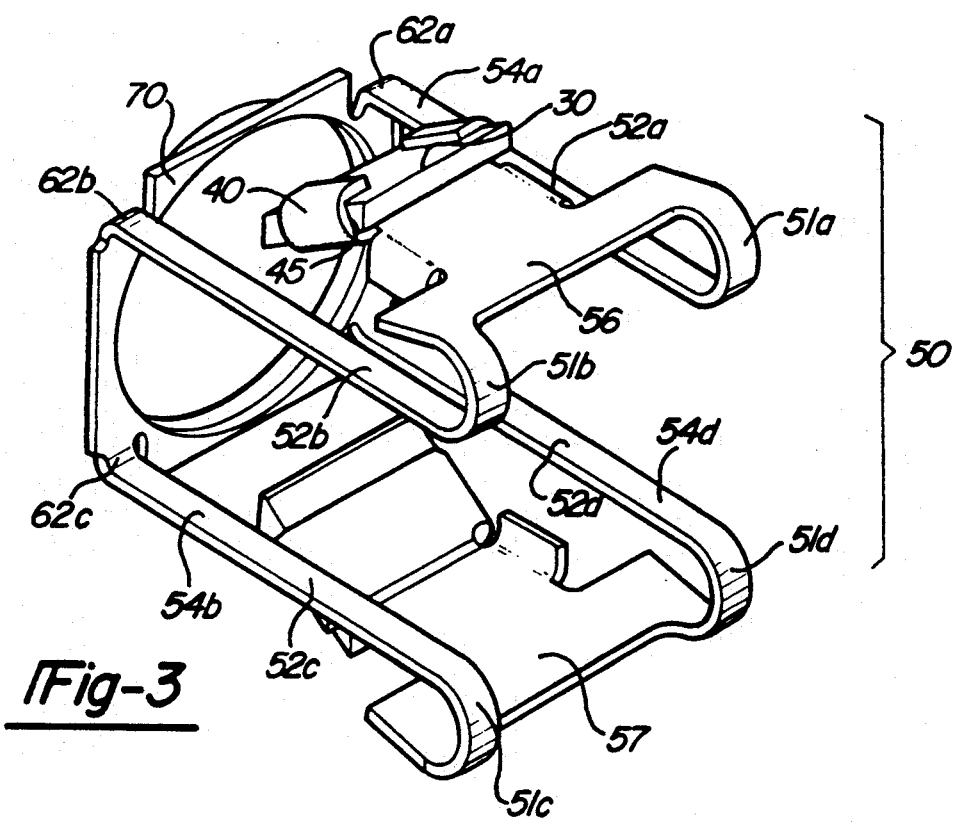
FIG. 3 is a perspective view of the primary retaining member of the present invention.

Referring to FIG. 3, a perspective view of the primary retainer member 50, according to the present invention, is shown. The primary retainer member is generally comprised of a retaining insert 30, a portion which envelops the retaining insert 40, depressible surface areas 56 and 57, curved portions 51(a-d) and straight portions 52(a-d) of configuration arms 54(a-d) and a collar 70. The configuration arms 54(a-d) project outwardly from the collar 70. At the point of this outward projection are joints 62(a-d), which allow for flexion as pressure is applied to surface areas 56 and 57. The configuration arms 54(a-d) provide a surface upon which the retaining insert 30 is able to pivot as pressure is applied to surface areas 56 and 57. When pressure is applied to the surface areas, the curved portions 51(a-d) of configuration arms 54(a-d) also allow for a small amount of flexion thereby relieving some of the pressure concentrated at joints 62(a-d). The entire primary retaining member 50 must be made of a sufficiently non-deformable material such as plastic or metal to allow flexion and a return to an unflexed position.

Figure 5:
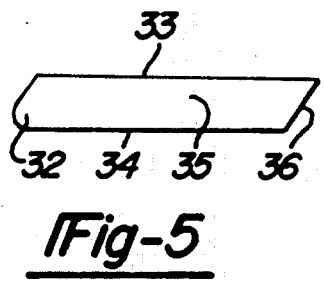
FIG. 5 is a side elevation view of a retaining insert.

Referring to FIGS. 3 and 5, retaining insert 30 is shown. Retaining insert 30 may have any suitable shape for cooperating with the portion enveloping the retaining insert 40 and, in the present invention, is of a generally parallelogram shape. The base edge 32 of the retaining insert is rounded to allow pivoting on the configuration arms 54(a-d) when sufficient pressure is applied to the surface areas 56 and 57 to bring the retaining insert into contact with the configuration arms. In the present invention, the retaining insert is disposed of an abutting surface 36 which is so angled to come into relatively flat contact with the surface 28 of a housing flange portion, as the primary retaining element 50 is pulled away from the housing. The size of the retaining insert 30 is long enough, from its rounded edge 32 to its opposing distal surface 36, to fit closely between the configuration arms 54(a-d) and the housing structure 20 when being retained by the portion responsible for securing the retaining insert 40, at the same time, is short enough to be able to clear the radially disposed surface 26 when disconnection is desired. The size of the insert also depends on the angle of the configuration arm portion 53 which incorporates the portion responsible for securing the retaining insert 40. The retaining insert 30 should be made of a sufficiently non-deformable material such as plastic or metal.

Figure 6:
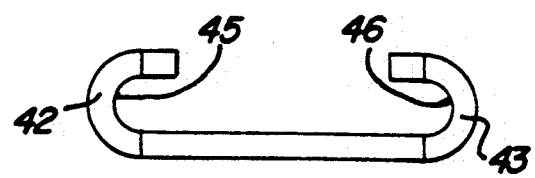
FIG. 6 is a top view of the retaining member portion responsible for securing the retaining insert.

Referring to FIGS. 3 and 6, the retaining member portion 40 responsible for securing the retaining insert is shown. The retaining member portion may be of any sufficient design so as to secure a retaining insert. The retaining member should also be made of a relatively non-deformable material such as plastic or metal.

In the preferred embodiment, the retaining member portion 40 has C-shaped end portions 42 and 43 which engulf portions of the top 33, bottom 34 and side 35 surfaces of the retaining insert. The retaining member portion is disposed of inner surface recesses 45 and 46 into which the end portions of the retaining insert securely fit so as to prevent any movement of the insert. In other designs of the present invention, the retaining member may be designed so as to prevent only lateral movement of the retaining insert, thus allowing some up and down movement. Such an embodiment may be employed where the length of the configuration arms 54(a-d) and the housing 20 are considerably shorter.

Figure 4:
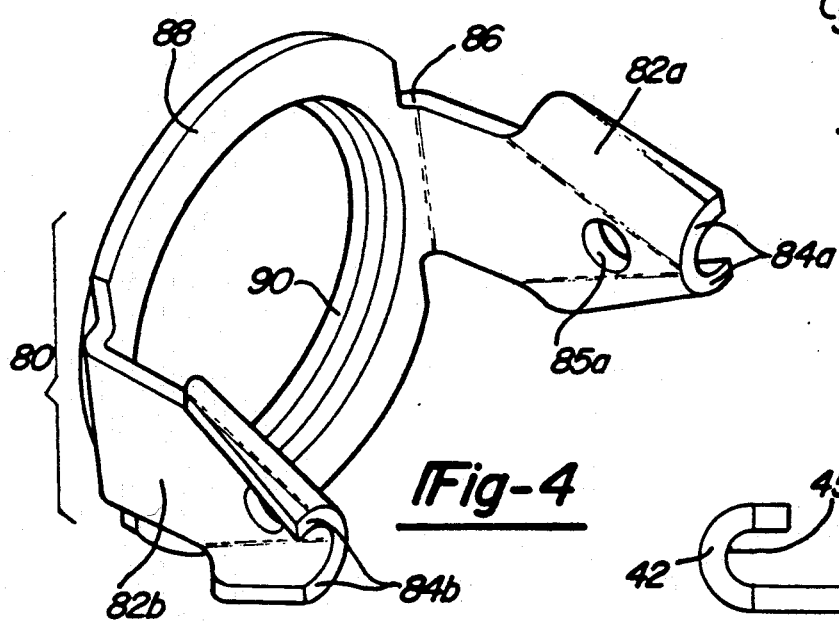
FIG. 4 is a perspective view of a seal retainer.

Referring to FIG. 4, a perspective view retainer 80, according to the present invention, is shown. The seal retainer 82 is generally comprised of arm portions 82(a-b) which have outwardly curved flange portions 84(a-b) which serve to abut the radially disposed surface of the housing. The arm portions 82(a-b) contain bore portions 85(a-b) into which a tool inserts so that the seal retainer can be removed when desired. The arm portions flex at a joint 86 when the seal retainer is being extracted from the housing. The joint 86 is connected to a collar member 88 is provided with an outwardly extending annular lip 90 which serves to fit tightly into a bushing which further serves to provide a fluid tight seal in combination with a number of plastic or rubber-like O-rings.

Whereas, the above description constitutes the preferred embodiment of the present invention, it will be appreciated that the invention is susceptible to modification, variation and change without departing from the proper scope and fair meaning of the accompanying claims.

What is claimed is:

1. A seal retainer adapted or preventing the high pressure blowout of sealing components comprising:

a continuous collar having an opening and a ring shape, said collar being substantially late and in a plane perpendicular to the colar central axis, an axially extending continuous lip portion surrounding said opening and extending from aid collar, said lip portion being adapted to fit tightly within an axial bore portion of a component housing assembly and adapted to abut seal means within the axial bore for sealing the ore and thereby preventing high pressure blowout of the seal means; and arm portions having a substantially flat planar configuration extending from outer circumferential positions of said collar substantially parallel to said central axis in a direction opposite of said lip, flange means for engaging a radially outwardly disposed surface of the housing assembly, said flange means extending from longitudinal edges of said arm portions.

2. A seal retainer according to claim 1, wherein said flange means includes outwardly curved flange potions to engage the radially outwardly disposed surface of the housing assembly.

3. A seal retainer, according to claim 1, wherein said retainer is made f a material with very high collapse strength to prevent the configuration arm portions from snapping off under high pressure.

* * * * *